United States Patent
Eidenberger et al.

(10) Patent No.: US 10,857,997 B2
(45) Date of Patent: Dec. 8, 2020

(54) METHOD AND ASSISTANCE SYSTEM FOR CONTROLLING A TECHNICAL SYSTEM

(71) Applicant: Siemens Aktiengesellschaft, Munich (DE)

(72) Inventors: Robert Eidenberger, Munich (DE); Werner Neubauer, Munich (DE)

(73) Assignee: SIEMENS AKTIENGESELLSCHAFT

( * ) Notice: Subject to any disclaimer, the term of this patent is extended or adjusted under 35 U.S.C. 154(b) by 269 days.

(21) Appl. No.: 15/746,060

(22) PCT Filed: Jul. 5, 2016

(86) PCT No.: PCT/EP2016/065783
§ 371 (c)(1),
(2) Date: Jan. 19, 2018

(87) PCT Pub. No.: WO2017/012856
PCT Pub. Date: Jan. 26, 2017

(65) Prior Publication Data
US 2018/0208191 A1 Jul. 26, 2018

(30) Foreign Application Priority Data
Jul. 21, 2015 (DE) .................. 10 2015 213 705

(51) Int. Cl.
*B60W 30/09* (2012.01)
*G05B 7/02* (2006.01)
(Continued)

(52) U.S. Cl.
CPC ........ *B60W 30/09* (2013.01); *B60W 50/0098* (2013.01); *B62D 15/0265* (2013.01);
(Continued)

(58) Field of Classification Search
CPC .. B60W 30/09; B60W 50/0098; B60W 50/12; B60W 30/0953; B60W 2550/12;
(Continued)

(56) References Cited

U.S. PATENT DOCUMENTS

| 7,310,981 B2 | 12/2007 | Kurz et al. |
| 2006/0156773 A1 | 7/2006 | Kurz et al. |

(Continued)

FOREIGN PATENT DOCUMENTS

| DE | 19904974 A1 | 8/2000 |
| DE | 102008040241 A1 | 1/2010 |

(Continued)

OTHER PUBLICATIONS

PCT International Search Report for PCT International Application No. PCT/EP 2016/065783, dated Sep. 29, 2016.

*Primary Examiner* — Brian P Sweeney
(74) *Attorney, Agent, or Firm* — Schmeiser, Olsen & Watts LLP

(57) ABSTRACT

In order to control a technical system, a user control variable is read in and a plurality of control variable variants of the user control variable are generated. A respective trajectory of the technical system is extrapolated for the user control variable and for the control variable variants, for which a respective reliability is evaluated. Furthermore, a respective distance of each control variable variant to the user control variable is determined. The user control variable is then selected as a control signal for the technical system in the event that the trajectory extrapolated for the user control variable is evaluated as reliable. Otherwise, a control variable variant with an extrapolated trajectory evaluated as reliable is selected from the control variable variants as a control signal, wherein a control variable variant with a low (Continued)

distance is preferably selected. Finally, the control signal for controlling the technical system is emitted.

15 Claims, 1 Drawing Sheet

(51) Int. Cl.
    *G05D 1/00*     (2006.01)
    *B60W 50/00*     (2006.01)
    *B62D 15/02*     (2006.01)

(52) U.S. Cl.
    CPC .............. *G05B 7/02* (2013.01); *G05D 1/0061* (2013.01); *G05D 2201/0202* (2013.01); *G05D 2201/0213* (2013.01)

(58) Field of Classification Search
    CPC ......... B60W 2550/14; B60W 2520/10; B60W 2050/0096; B60W 2050/0071; B60W 2050/006; B60W 2540/18; B60W 2540/12; B60W 2540/10; B62D 15/0265; G05D 1/0061; G05D 2201/0213; G05D 2201/0202; G05B 7/02
    USPC ........................................................... 701/23
    See application file for complete search history.

(56) References Cited

U.S. PATENT DOCUMENTS

| | | |
|---|---|---|
| 2013/0184925 A1 | 7/2013 | Niemz et al. |
| 2015/0227121 A1 | 8/2015 | Düll et al. |
| 2015/0346724 A1* | 12/2015 | Jones et al. .......... G05D 1/0088 |
| 2016/0040602 A1 | 2/2016 | Brummel et al. |

FOREIGN PATENT DOCUMENTS

| | | |
|---|---|---|
| DE | 102012216574 A1 | 3/2014 |
| DE | 102013205356 A1 | 10/2014 |
| EP | 1990250 A2 | 11/2008 |
| WO | WO 2004076086 A2 | 9/2004 |
| WO | WO 2012010365 A1 | 1/2012 |

* cited by examiner

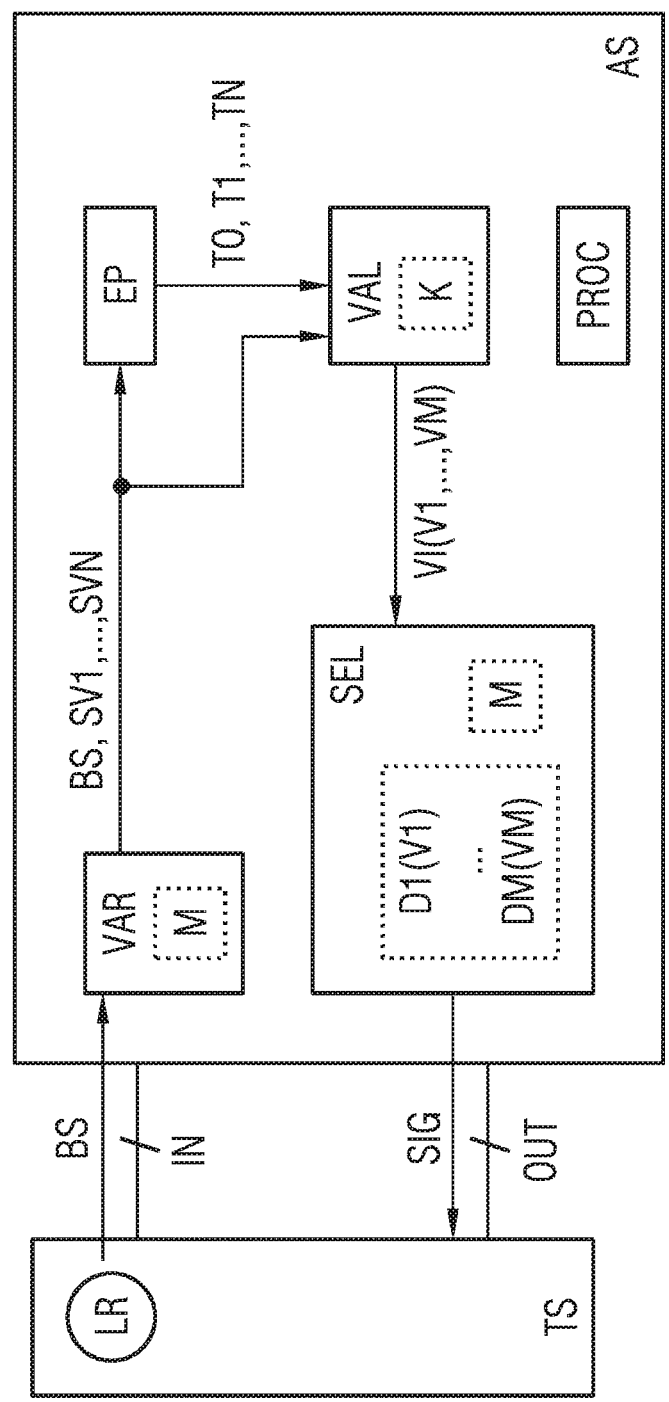

METHOD AND ASSISTANCE SYSTEM FOR CONTROLLING A TECHNICAL SYSTEM

CROSS-REFERENCE TO RELATED APPLICATIONS

This application claims priority to PCT Application No. PCT/EP2016/065783, having a filing date of Jul. 5, 2016, based off of German application No. DE 102015213705.8 having a filing date of Jul. 21, 2015, the entire contents of both of which are hereby incorporated by reference.

FIELD OF TECHNOLOGY

Technical systems which are manually controlled by one or more users can enter invalid, undesirable and/or impermissible states as a result of operating errors or other influences. In order to avoid such states, contemporary technical systems often have an assistance system which is intended to prevent a transition to these states by taking over control in critical situations. Examples of such assistance systems are, for instance, traction control or collision avoidance in motor vehicles or collision avoidance in diggers or cranes.

BACKGROUND

An assistance system often completely takes over control upon reaching or shortly before reaching critical states. In these situations, no intervention possibilities or only restricted intervention possibilities remain for a user for the duration of the takeover. If control is returned to the user again at the end of the takeover by the assistance system, a behavior of the technical system which is jerky for the user can occur, however. Such a jerky behavior can surprise the user and can cause an operating error of the technical system.

SUMMARY

An aspect relates to specifying a method and an assistance system for controlling a technical system which can be operated in an improved manner by a user.

In order to control a technical system, embodiments of the invention provide for a user manipulated variable to be read in and for a multiplicity of manipulated variable variants of the user manipulated variable to be generated. In this case, the user manipulated variable can be read in, for example, from an analog input device, for example a joystick, a gas pedal, a steering wheel etc. Furthermore, a respective trajectory of the technical system is extrapolated, to be precise respectively for controlling the technical system by means of the user manipulated variable and for control by a respective manipulated variable variant. A permissibility of the extrapolated trajectories is also assessed. In this case, possible or sufficiently likely reaching of a critical system state, for example the possibility of a collision, can be used, for example, as an assessment criterion. In addition, a respective distance between a respective manipulated variable variant and the user manipulated variable is determined. The user manipulated variable is then selected as the control signal if the trajectory extrapolated for the user manipulated variable is assessed to be permissible. Otherwise, a manipulated variable variant is selected from the manipulated variable variants with an extrapolated trajectory assessed to be permissible as the control signal, a manipulated variable variant with a shorter distance preferably being selected. Finally, the control signal for controlling the technical system is output.

An assistance system according to embodiments of the invention is set up to carry out the above method.

An important advantage of embodiments of the invention can be seen in the fact that a certain amount of residual control of the technical system nevertheless remains for the user when the assistance system takes over control since the selected manipulated variable is oriented to the current user manipulated variable in each case. Furthermore, a jerky behavior when returning control to the user can be avoided or at least reduced.

According to one advantageous embodiment of the invention, a manipulated variable variant with a minimum distance can be selected from the manipulated variable variants with an extrapolated trajectory assessed to be permissible as the control signal. This allows virtually maximum residual control of the technical system by the user provided that the selected manipulated variable differs minimally from the user manipulated variable.

Furthermore, a predefined distance metric can be used to determine the distance between a manipulated variable variant and the user manipulated variable. In this case, the distance metric may also take into account a distance between the trajectories extrapolated from the manipulated variable variant and the user manipulated variable.

In particular, the manipulated variable variants can be generated in a range around the user manipulated variable determined by the distance metric. The range may preferably be defined by a predefined maximum distance to the user manipulated variable. This makes it possible to exclude manipulated variable variants which would result in an unacceptable discontinuity in the system behavior of the technical system when taking over or returning control.

The manipulated variable variants can be selected within the predefined range by a random process.

Furthermore, time-dependent functions may be generated as manipulated variable variants. Such a time-dependent function may be generated, for example, as a manipulated variable profile and/or as a temporally resolved manipulated variable sequence. This also makes it possible to take into account complex control sequences when extrapolating, assessing and/or selecting the trajectories and/or manipulated variables.

The manipulated variable variants may be advantageously selected from a database containing frequent control patterns, preferably user-specific control patterns.

Furthermore, a number of the manipulated variable variants to be generated can be determined on the basis of a currently available computing power. In this manner, a computing complexity required to carry out the method can be adapted to the available computing power. It can therefore be generally ensured that the control complies with a required real-time requirement.

The generation of the manipulated variable variants, the temporal extrapolation of the trajectories, the assessment of the permissibility of the trajectories, the determination of the distances and/or the selection of the control signal can preferably be carried out continuously.

According to an advantageous embodiment of the invention, the trajectories can be extrapolated on the basis of a system model of the technical system. In particular, the trajectories can be extrapolated by simulating a system behavior of the technical system on the basis of the system model.

In addition, an operating parameter and/or an environmental parameter of the technical system can be recorded.

The trajectories can then be extrapolated on the basis of the recorded operating parameter and/or environmental parameter. A vehicle speed, a road condition, an outside temperature and/or other weather or environmental conditions, for example, can be recorded as the operating parameter or environmental parameter and can be taken into account during extrapolation.

Furthermore, a respective trajectory can be extrapolated up to an extrapolation limit which can be dynamically determined on the basis of a recorded operating parameter and/or environmental parameter.

In particular, the extrapolation limit can be determined in such a manner that the technical system can be controlled into a safe system state within the extrapolation limit.

BRIEF DESCRIPTION

Some of the embodiments will be described in detail, with reference to the following FIGURE, wherein like designations denote like members, wherein:

The FIGURE shows a schematic illustration of an assistance system when controlling a technical system.

DETAILED DESCRIPTION

The FIGURE schematically illustrates an interactive assistance system AS for controlling a technical system TS. The technical system TS may be, for example, a motor vehicle, a digger, a crane or another system to be controlled by a user. In particular, the assistance system AS according to embodiments of the invention may also be part of the technical system TS. In order to control the technical system TS by a user, a steering wheel LR is provided as an analog input device in the present exemplary embodiment. Alternatively or additionally, a joystick, a gas pedal, a brake pedal etc. may also be provided as the input device.

The assistance system AS has an input interface IN to the technical system TS, via which a current user manipulated variable BS is continuously read in from the steering wheel LR. The user manipulated variable BS may indicate, for example, a rotational angle of the steering wheel LR within a predefined range of values. Alternatively or additionally, the user manipulated variable BS may also be a single-component or multi-component manipulated variable vector which is read in from a multi-axis joystick, for example.

The user manipulated variable BS is transmitted to a variation module VAR of the assistance system AS. The variation module VAR is used to continuously generate a multiplicity of manipulated variable variants $SV1, \ldots, SVN$ of the user manipulated variable BS which is currently read in. In this case, the manipulated variable variants $SV1, \ldots, SVN$ may also comprise, in particular, the current user manipulated variable BS. The manipulated variable variants $SV1, \ldots, SVN$ are generated in a range of values around the user manipulated variable BS which is dependent on the user manipulated variable BS. This range of values preferably comprises manipulated variable values which are in the vicinity of the user manipulated variable BS with regard to a distance dimension, preferably a distance metric M. The range of values may therefore comprise, for example, manipulated variable values within a predefined maximum distance to the current user manipulated variable BS. Within the range of values, the manipulated variable variants $SV1, \ldots, SVN$ can be generated on the basis of a random process. In addition, the manipulated variable variants $SV1, \ldots, SVN$ may also be generated as time-dependent functions, that is to say as temporally varying manipulated variable functions. Furthermore, manipulated variable variants may be read from a database containing frequent control patterns, preferably user-specific control patterns. A number N of the generated manipulated variable variants $SV1, \ldots, SVN$ can be determined on the basis of a currently available computing power of a processor PROC carrying out the method steps of the assistance system AS.

The current user manipulated variable BS and the manipulated variable variants $SV1, \ldots, SVN$ generated therefrom are transmitted from the variation module VAR to an extrapolation module EP of the assistance system AS and to an assessment module VAL of the assistance system AS.

The extrapolation module EP is used to continuously extrapolate trajectories $T0, T1, \ldots, TN$ of the technical system TS. Such trajectories are path curves of the technical system TS or of a part thereof in a state space of the technical system TS, for example a spatial path curve of a motor vehicle, of a digger bucket or of a crane boom. The trajectories $T0, T1, \ldots, TN$ can be extrapolated spatially, temporally or in another direction of the state space.

The extrapolation module EP calculates and/or simulates a system behavior of the technical system TS or of a part of the latter for the user manipulated variable BS and for all manipulated variable variants $SV1, \ldots, SVN$. That is to say, the system behavior is respectively determined assuming that the technical system TS is controlled by the user manipulated variable BS or by means of a respective manipulated variable variant $SV1, \ldots, SVN$. Such a system behavior may relate to a braking distance or an evasive maneuver of a motor vehicle, for example. The extrapolation module EP possibly has a simulation module for simulating the system behavior of the technical system TS on the basis of a system model of the technical system TS.

In order to calculate the system behavior, operating parameters and/or environmental parameters of the technical system TS are preferably recorded, for example a vehicle speed, a road condition, an outside temperature and/or other weather or environmental conditions. The trajectories $T0, T1, \ldots, TN$ are then extrapolated on the basis of the recorded operating parameters and/or environmental parameters. In this manner, a braking distance can be calculated to be longer, the higher the vehicle speed, for example. Rain or slipperiness can therefore also be taken into account during extrapolation.

For the present exemplary embodiment, $T0$ is the extrapolated trajectory of the technical system TS when controlling the technical system TS by the user manipulated variable BS. Accordingly, $T1, \ldots$ and $TN$ are each an extrapolated trajectory of the technical system TS when controlling the technical system TS by the respective manipulated variable variant $SV1, \ldots$ and SVN.

The trajectories $T0, T1, \ldots, TN$ are each extrapolated by the extrapolation module EP up to a dynamically determined extrapolation limit. Such an extrapolation limit is often also referred to as a look-ahead. The extrapolation limit is preferably continuously dynamically determined on the basis of recorded operating parameters and/or environmental parameters, specifically in such a manner that the technical system TS can be controlled into a safe system state within the extrapolation range. The braking distance and the braking time therefore increase with increasing speed in a motor vehicle, for example, with the result that the extrapolation limit in this case is temporally and/or spatially increased in such a manner that the motor vehicle can be brought to a standstill within the extrapolation range.

The extrapolated trajectories $T0, T1, \ldots, TN$ are transmitted from the extrapolation module EP to the assessment module VAL. The assessment module VAL assesses a permissibility for each of the extrapolated trajectories T0, T1, ..., TN on the basis of a predefined assessment criterion K. Possible or sufficiently likely reaching of a critical system state, for example the possibility of a collision, can be used, for example, as the assessment criterion K. As the result of this assessment, the assessment module VAL generates an item of permissibility information VI which indicates, for example, which of the manipulated variables BS and SV1, ..., SVN result in a permissible trajectory. In this case, those trajectories in which a critical system state does not occur within the extrapolation range can be interpreted as permissible. In the present exemplary embodiment, the permissibility information VI contains those manipulated variables V1, ..., VM from a set comprising the user manipulated variable BS and the manipulated variable variants SV1, ..., SVN which result in a permissible trajectory. The permissibility information VI is transmitted from the assessment module VAL to a selection module SEL of the assistance system AS.

A manipulated variable is selected from the manipulated variables V1, ..., VM with a permissible trajectory by the selection module SEL and is output as the control signal SIG for controlling the technical system TS.

As part of the selection, the selection module SEL first of all checks on the basis of the permissibility information VI whether the user manipulated variable BS results in a permissible trajectory. In the present exemplary embodiment, it is possible to check for this purpose whether the user manipulated variable BS is included in the permissibility information VI. If this is true, the user manipulated variable BS is selected as the control signal SIG.

In contrast, if the user manipulated variable BS results in an impermissible trajectory, the selection module SEL instead selects one of the manipulated variables V1, ..., VM which result in a permissible trajectory as the control signal SIG. For this purpose, the selection module SEL determines, for all manipulated variables V1, ..., VM, distances D1(V1), ..., DM(VM) between the manipulated variables V1, ..., VM and the user manipulated variable BS with respect to the predefined distance metric M. The distance metric M can represent, for example, a Euclidean distance in a state space for manipulated variables of the technical system TS. In addition, the distance metric M may also be dependent on a distance between the trajectories extrapolated from the relevant manipulated variables. That manipulated variable which has a minimum distance to the user manipulated variable BS is then selected from the manipulated variables V1, ..., VM as the control signal SIG. The selected control signal SIG is finally output via an output interface OUT of the technical system TS for the purpose of controlling the technical system TS.

The assistance system AS according to embodiments of the invention make it possible to retain residual control of the technical system TS by the user even when control is taken over by the assistance system AS since the manipulated variable selected by the assistance system AS is oriented to the current user manipulated variable BS in each case. This makes it possible to avoid or at least reduce a jerky behavior when returning control to the user.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a technical system with residual user control, comprising:
    a) reading in, by an assistance system having a processor, a user manipulated variable for controlling the technical system,
    b) generating, by the assistance system, a multiplicity of manipulated variable variants of the user manipulated variable,
    c) extrapolating, by the assistance system, a respective trajectory of the technical system for controlling the technical system by the user manipulated variable and for control by a respective manipulated variable variant, respectively,
    d) assessing, by the assistance system, a permissibility of the extrapolated trajectories,
    e) determining, by the assistance system, a respective distance between a respective manipulated variable variant and the user manipulated variable,
    f) selecting, by the assistance system, the user manipulated variable as the control signal if the trajectory extrapolated for the user manipulated variable is assessed to be permissible, and otherwise selecting a manipulated variable variant from the manipulated variable variants with an extrapolated trajectory assessed to be permissible as the control signal, wherein a manipulated variable variant with a shorter distance is preferably selected,
    g) outputting, by the assistance system, the control signal, and
    h) controlling the technical system according to the control signal.

2. The method as claimed in claim 1, wherein a manipulated variable variant with a minimum distance is selected from the manipulated variable variants with an extrapolated trajectory assessed to be permissible as the control signal.

3. The method as claimed in claim 1, wherein a predefined distance metric is used to determine the distance between a manipulated variable variant and the user manipulated variable.

4. The method as claimed in claim 3, wherein the manipulated variable variants are generated in a range around the user manipulated variable determined by the distance metric.

5. The method as claimed in claim 4, wherein the manipulated variable variants are selected within the predefined range by a random process.

6. The method as claimed in claim 1, wherein time-dependent functions are generated as manipulated variable variants.

7. The method as claimed in claim 1, wherein the manipulated variable variants are selected from a database containing frequent control patterns.

8. The method as claimed in claim 1, wherein a number of the manipulated variable variants to be generated is determined on the basis of a currently available computing power.

9. The method as claimed in claim 1, wherein the generation of the manipulated variable variants, the temporal extrapolation of the trajectories, the assessment of the permissibility of the trajectories, the determination of the distances and/or the selection of the control signal are carried out continuously.

10. The method as claimed in claim 1, wherein the trajectories are extrapolated on the basis of a system model of the technical system.

11. The method as claimed in claim 1, further comprising:
recording an operating parameter and/or an environmental parameter of the technical system,
wherein the trajectories are extrapolated on the basis of the recorded operating parameter and/or environmental parameter.

12. The method as claimed in claim 1, wherein a respective trajectory is extrapolated up to an extrapolation limit which is dynamically determined on the basis of a recorded operating parameter and/or environmental parameter.

13. The method as claimed in claim 12, wherein the extrapolation limit is determined in such a manner that the technical system can be controlled into a safe system state within the extrapolation limit.

14. A computer program product, comprising:
a computer readable hardware storage device, and
a computer readable program code stored therein, said program code executable by a processor of an assistance system to implement a method for controlling a technical system with residual user control, the method comprising:
reading in a user manipulated variable for controlling the technical system,
generating a multiplicity of manipulated variable variants of the user manipulated variable,
extrapolating a respective trajectory of the technical system for controlling the technical system by the user manipulated variable and for control by a respective manipulated variable variant, respectively,
assessing a permissibility of the extrapolated trajectories,
determining a respective distance between a respective manipulated variable variant and the user manipulated variable,
selecting the user manipulated variable as the control signal if the trajectory extrapolated for the user manipulated variable is assessed to be permissible, and otherwise selecting a manipulated variable variant from the manipulated variable variants with an extrapolated trajectory assessed to be permissible as the control signal, wherein a manipulated variable variant with a shorter distance is preferably selected,
outputting the control signal, and
controlling the technical system according to the control signal.

15. An assistance system, comprising:
a processor;
a memory coupled to the processor; and
a computer readable hardware storage device containing program code executable by a the processor to implement a method for controlling a technical system with residual user control, the method comprising:
reading in a user manipulated variable for controlling the technical system,
generating a multiplicity of manipulated variable variants of the user manipulated variable,
extrapolating a respective trajectory of the technical system for controlling the technical system by the user manipulated variable and for control by a respective manipulated variable variant, respectively,
assessing a permissibility of the extrapolated trajectories,
determining a respective distance between a respective manipulated variable variant and the user manipulated variable,
selecting the user manipulated variable as the control signal if the trajectory extrapolated for the user manipulated variable is assessed to be permissible, and otherwise selecting a manipulated variable variant from the manipulated variable variants with an extrapolated trajectory assessed to be permissible as the control signal, wherein a manipulated variable variant with a shorter distance is preferably selected,
outputting the control signal, and
controlling the technical system according to the control signal.

* * * * *